(12) United States Patent
Packer (10) Patent No.: US 6,754,720 B1
(45) Date of Patent: Jun. 22, 2004

(54) AUTOMATIC ADDRESSING OF EXPANDERS IN I/O SUBSYSTEM

(75) Inventor: John S. Packer, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 397 days.

(21) Appl. No.: 09/798,275

(22) Filed: Mar. 2, 2001

(51) Int. Cl.[7] .......................... G06F 3/00; G06F 12/06; G06F 13/38
(52) U.S. Cl. ................. 710/3; 710/2; 710/4; 710/8; 710/9; 710/15; 710/104; 711/1; 709/234
(58) Field of Search .................. 710/3, 8, 9, 10, 710/15, 33, 52, 62, 104, 300, 2, 4; 709/234; 711/1, 200, 300

(56) References Cited

U.S. PATENT DOCUMENTS

| | | | | |
|---|---|---|---|---|
| 5,745,493 A | * | 4/1998 | St. Clair | 370/438 |
| 5,815,074 A | * | 9/1998 | Sasagawa et al. | 340/505 |
| 5,925,120 A | * | 7/1999 | Arp et al. | 710/314 |
| 6,115,772 A | * | 9/2000 | Crater | 710/306 |
| 6,381,666 B1 | * | 4/2002 | Kejser et al. | 710/300 |
| 6,493,785 B1 | * | 12/2002 | Galloway | 710/314 |
| 6,510,481 B1 | * | 1/2003 | Petty | 710/305 |
| 6,546,497 B1 | * | 4/2003 | Galloway et al. | 713/501 |
| 6,557,064 B1 | * | 4/2003 | Galloway | 710/260 |

* cited by examiner

Primary Examiner—Jeffrey Gaffin
Assistant Examiner—Angel L. Casiano
(74) Attorney, Agent, or Firm—Martine & Penilla, LLP (57) ABSTRACT

The present invention provides methods for automatically assigning addresses to expanders in a computer I/O subsystem that is coupled to one or more host computers. The computer I/O subsystem includes one or more peripheral buses, a set of peripheral devices, and a set of expanders with each expander being arranged to couple a pair of peripheral buses. The peripheral devices are coupled to the peripheral buses. In this configuration, a host computer selects a peripheral device as a target device and writes an address data pattern to the selected target device. The host computer then selects the target device and reads the address data pattern from the target device. Unique addresses are then assigned to one or more expanders coupling the host computer and the target device starting from the address data pattern, preferably by incrementing the address data pattern.

31 Claims, 7 Drawing Sheets

AUTOMATIC ADDRESSING OF EXPANDERS IN I/O SUBSYSTEM

CROSS REFERENCE TO RELATED APPLICATIONS

This application is related to U.S. patent application Ser. No. 09/798,278 entitled "Methods for Assigning Addresses to Expanded Devices in I/O Subsystem" by Charles A. Monia et al. This application is also related to U.S. patent application Ser. No. 09/798,100 entitled "I/O Subsystem Topology Discovery Method" by John S. Packer. These applications, filed on the same day as the present application, are incorporated herein by reference.

BACKGROUND OF THE INVENTION

1. Field of the Invention

This invention relates generally to computer I/O subsystems having expanders, and more particularly to methods for automatically assigning addresses to expanders in I/O subsystems over peripheral buses.

2. Description of the Related Art

Modern computer systems often utilize one or more buses to connect to peripheral devices to enhance its resources. For example, the resources of a computer system may be substantially increased by connecting the computer system to one or more peripheral devices such as disk drives, tape drives, printers, scanners, optical drives, and the like. These peripheral devices are attached to the computer system by means of a peripheral bus (e.g., cable).

One of the most widely used peripheral buses is the well known small computer systems interface (SCSI) bus, which is defined in conformity with well known SCSI protocols (e.g., SCSI-1, SCSI-2, SCSI-3, etc.), which are incorporated herein by reference. The SCSI protocols are designed to provide an efficient peer-to-peer I/O interface between a host computer and its peripheral devices in a computer system.

Figure 1:
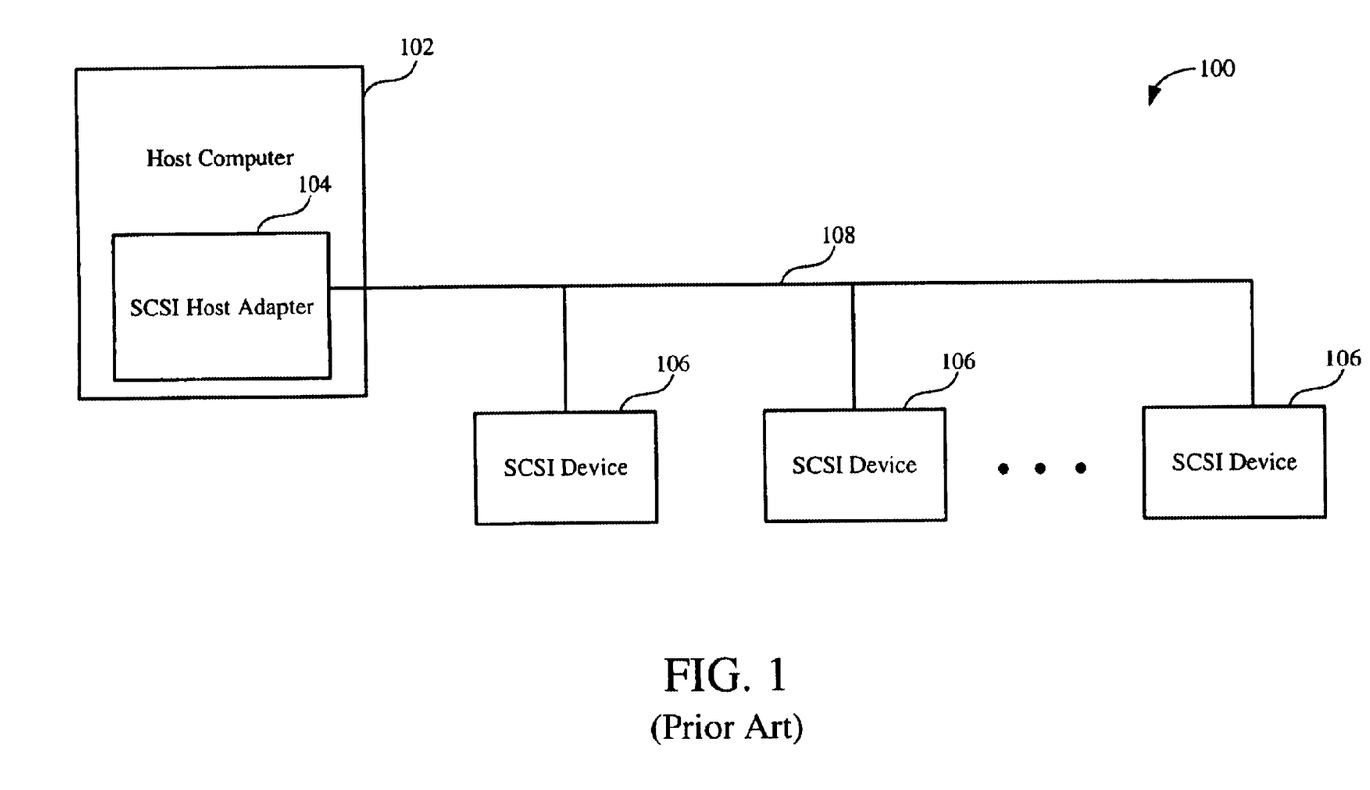
FIG. 1 shows a block diagram of a conventional computer system including a host computer, a plurality of SCSI devices, and a SCSI bus.

FIG. 1 shows a block diagram of a conventional computer system 100 including a host computer 102, a plurality of SCSI devices 106, and a SCSI bus 108. The host computer 102 includes a SCSI host adapter 104 for communicating with the SCSI devices 106. The host adapter 104 in the computer system 100 controls communication between the host computer 102 and the SCSI devices 106. For example, the host adapter 104 provides a physical connection between the host computer 102 and the SCSI bus 108. In addition, it is configured to receive data, address, and control signals from the host computer 102 and convert the signals into corresponding SCSI compatible data, address, and control signals. Conversely, the SCSI host adapter 104 is also configured to receive SCSI compatible data, address, and control signals from the SCSI devices 106 through the SCSI bus 108 and convert them into corresponding host-bus compatible data, addressing, and control signals. The SCSI host adapter 104 is well known in the art and may be implemented, for example, by using AIC-7890A™ packaged semiconductor device, which is available from Adaptec Inc., of Milpitas, Calif.

Under the conventional SCSI specifications, the SCSI bus 108 may connect up to 16 SCSI devices including the host adapter 104 depending on the type of SCSI bus implemented. The SCSI devices 106 may be peripheral devices such as disk drives, tape drives, printers, scanners, optical drives, or any other devices that meet the SCSI specification. The SCSI bus 108 is typically implemented as a cable having a set of parallel wires. For example, the SCSI-1 cable has 50 wires. Of these 50 wires, eight wires are for data, one wire is for parity, nine wires are for control, 25 wires are for ground, and the remaining wires are for power or are reserved for future use. The eight data wires are used to carry eight bits of data in parallel. In general, conventional SCSI bus cables include either 8 or 16 data wires for carrying 8 or 16 bits, respectively, of data in parallel. The data wires in the bus thus define a datapath for communicating bits equal to the number of data wires in the bus.

A traditional SCSI bus may accommodate a plurality of SCSI devices up to a maximum number equal to the number of data bits in the SCSI bus. In practice, the width of the SCSI datapath is typically 8 or 16 bits corresponding to the number of data wires in the SCSI bus. This means the maximum number of SCSI devices, including a host adapter, that can be attached to a SCSI bus is limited to 8 or 16.

Conventional SCSI buses, however, are generally capable of transmitting signals reliably for a specified cable length only. For example, SCSI bus cables conforming to SCSI specifications are typically limited to a maximum length such as 3, 6, 12, or 25 meters, and the like. In modern computer systems such as servers that need to communicate with numerous SCSI devices, some SCSI peripheral devices may be located more than the specified cable length away from a host computer.

Figure 2:
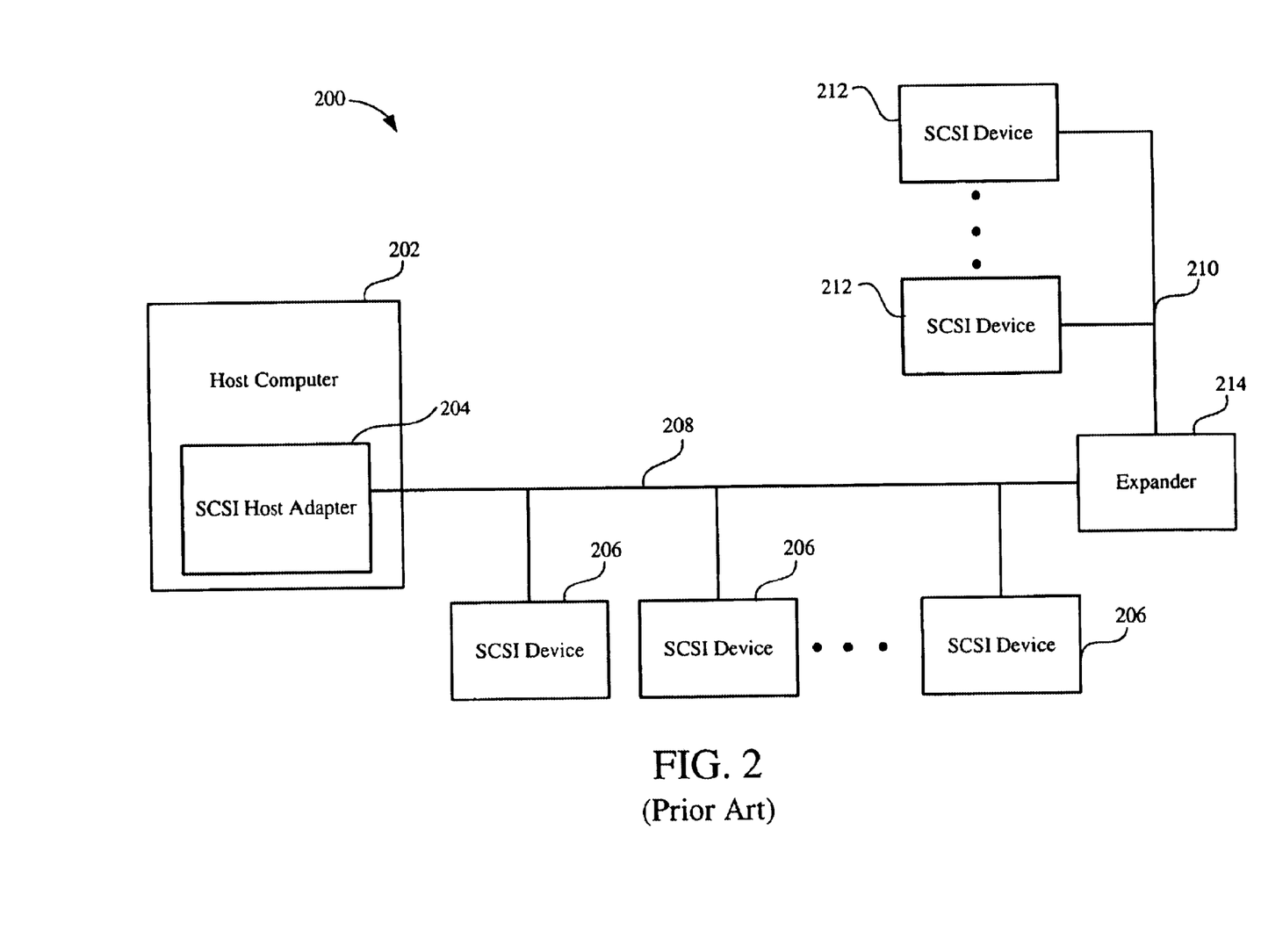
FIG. 2 illustrates a conventional computer system that includes an expander for connecting a pair of SCSI buses.

In such instances, an expander, which is essentially a repeater, is typically used to add another SCSI bus, which is then used to couple additional SCSI devices. FIG. 2 illustrates a conventional computer system 200 that includes an expander 214 for connecting two SCSI buses 208 and 210. In the computer system 200, a host computer 202 is coupled to the SCSI bus 208 via a SCSI host adapter 204. One or more SCSI devices 206 are coupled to the SCSI bus 208 while one or more SCSI devices 212 are coupled to the SCSI bus 210. The expander 214 is coupled between the SCSI buses 208 and 210 to regenerate signals received on either SCSI bus 208 or 210 for transmission to the other SCSI bus. In this configuration, the expander 214 functions to extend the length of the overall SCSI bus so that additional SCSI devices 212 or expanders can be attached to the SCSI bus 210. The SCSI devices 212 and SCSI bus 210 are collectively referred to as a segment. Similarly, the host adapter 204, SCSI devices 206, and SCSI bus 208 collectively define another segment.

Conventional expanders, however, are typically transparent devices without SCSI IDs of their own. This means that the expanders are not addressable and are thus invisible to SCSI protocol. Using such transparent expanders without dedicated SCSI IDs in an I/O subsystem presents several drawbacks. For example, individual segments of the I/O subsystem often need to be modified to isolate faulty cables, connections, drivers, and receivers. In addition, it is often desirable to communicate with individual expanders to determine optimum speed at which the expanders can communicate during domain validation.

Because conventional expanders are not addressable, these modifications and domain validation processes may not be performed automatically without a system administrator. One obvious solution would be to implement expanders like SCSI devices by adding SCSI controllers and assigning SCSI IDs used for SCSI devices. This solution, however, would reduce the number of addressable SCSI devices that can be attached to a SCSI I/O subsystem. Further, assigning SCSI addresses to expanders will typically require system administrators to keep track of SCSI IDs of all individual expanders and manually set the jumpers for the expander IDs. In a complex I/O subsystem with substantial number of SCSI devices and expanders, assigning SCSI IDs to expanders by manually setting the jumpers may be complicated and labor intensive.

In view of the foregoing, what is needed is a method for automatically addressing SCSI expanders without using valuable conventional SCSI IDs.

SUMMARY OF THE INVENTION

The present invention fills these needs by providing methods for automatically assigning addresses to intelligent expanders in an I/O subsystem. It should be appreciated that the present invention can be implemented in numerous ways, including as a process, an apparatus, a system, a device, a method, or a computer readable medium. Several inventive embodiments of the present invention are described below.

In one embodiment, the present invention provides a method for automatically assigning addresses to expanders in a computer I/O subsystem that is coupled to one or more host computers. The computer I/O subsystem includes one or more peripheral buses, a set of peripheral devices, and a set of expanders with each expander being arranged to couple a pair of peripheral buses. The peripheral devices are coupled to the peripheral buses. In this configuration, a host computer selects a peripheral device as a target device and writes an address data pattern to the selected target device. The host computer then selects the target device and reads the address data pattern from the target device. Unique addresses are then assigned to one or more expanders coupling the host computer and the target device starting from the address data pattern, preferably by incrementing the address data pattern.

In another embodiment, the present invention provides a method for automatically assigning addresses to expanders in a computer I/O subsystem that is coupled to one or more host computers. The computer I/O subsystem includes one or more peripheral buses, a set of peripheral devices, and a set of expanders with each expander being arranged to couple a pair of peripheral buses. The peripheral devices are coupled to the peripheral buses. In this method, the host computer selects a peripheral device as a target device and sends a write buffer command to the target device to write an address data pattern. The host computer then selects the target device and sends a read buffer command to the target device to read the address data pattern from the target device. Unique addresses are assigned to one or more expanders coupling the host computer and the target device beginning from the address data pattern. Specifically, an expander is selected among the one or more expanders coupling the host computer and the target device. The address data pattern is assigned to the selected expander as a unique address. Then, the address data pattern is incremented to generate a next address data pattern for assignment to a next expander.

In yet another embodiment, the present invention discloses a method for automatically assigning addresses to expanders in a computer I/O subsystem that is coupled to one or more host computers. The computer I/O subsystem includes one or more peripheral buses, a set of peripheral devices, and a set of expanders with each peripheral bus having an N-bit data bus. Each expander is arranged to couple a pair of peripheral buses. The peripheral devices are coupled to the peripheral buses. The method includes: (a) defining an expander address space for address data patterns by partitioning the N-bit data bus into a pair of fields that includes an expander ID field and an expander signature field, wherein each address data pattern includes a common expander signature in the expander signature field and an expander ID in the expander ID field and wherein more than two bits are asserted in each of the address data patterns; (b) issuing, by a host computer, a broadcast command to the expanders in the I/O subsystem, the broadcast command indicating an automatic addressing mode to automatically assign addresses to the expanders; (c) selecting, by the host computer, a peripheral device as a target device and sending a write buffer command to the target device to write an address data pattern; (d) selecting, by the host computer, the target device and sending a read buffer command to the target device to read the address data pattern from the target device; and (e) assigning unique addresses to one or more expanders coupling the host computer and the target device, wherein the unique addresses are assigned to the one or more expanders starting from the address data pattern.

Advantageously, the methods of the present invention allow automatic assignment of addresses to expanders without using conventional one-bit SCSI device IDs. To automatically assign addresses to expanders, a host computer sequentially traverses each of the peripheral devices by writing and reading an address data pattern, which is preferably configured to have more than two bits asserted. By sequentially writing and reading the address data pattern to a target peripheral device, expanders in the path between the host computer and the target peripheral device are assigned addresses starting from the address data pattern. As an address data pattern is assigned to an expander, the address data pattern is modified, for example by incrementing, for assignment to a next expander. In this manner, when all peripheral devices have been traversed, all addressable expanders in the I/O subsystem are automatically assigned unique addresses. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

The present invention provides methods for automatically addressing expanders in an I/O subsystem. It will be obvious, however, to one skilled in the art, that the present invention may be practiced without some or all of these specific details. In other instances, well known process operations have not been described in detail in order not to unnecessarily obscure the present invention.

Figure 3A:
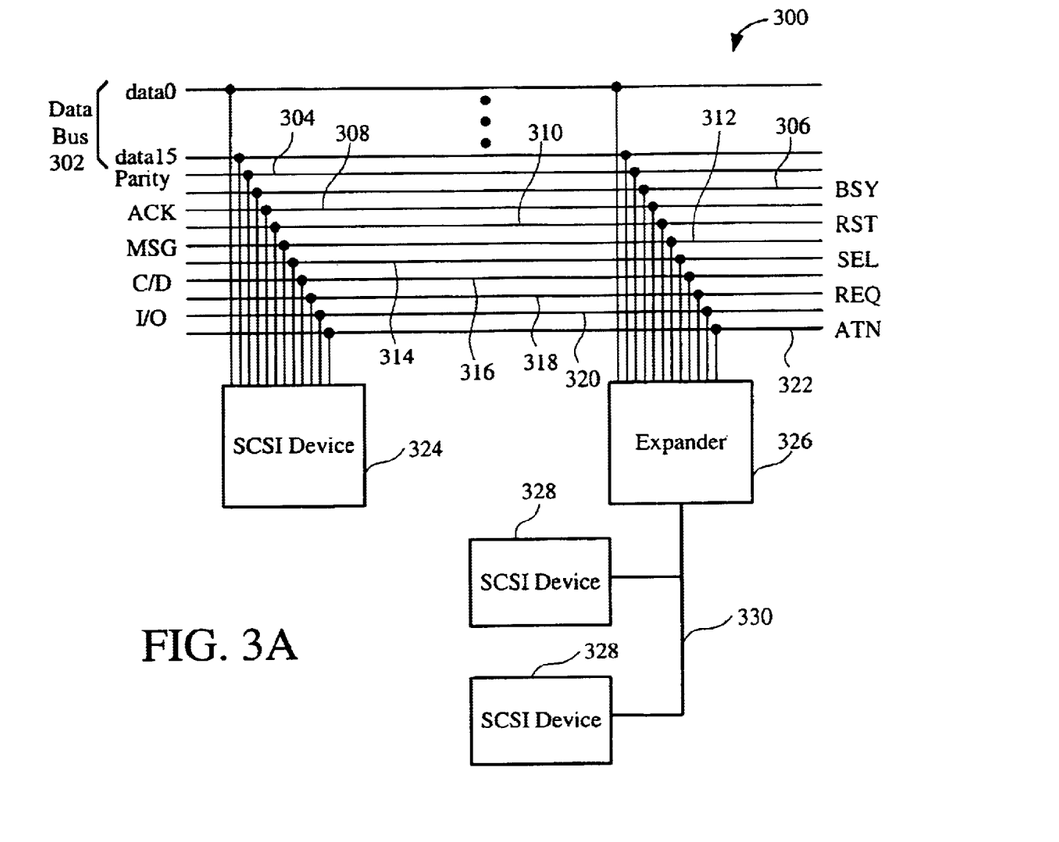
FIG. 3A illustrates a schematic diagram of an exemplary SCSI bus that is used to connect one or more SCSI devices and one or more expanders in accordance with one embodiment of the present invention.

FIG. 3A illustrates a schematic diagram of an exemplary SCSI bus 300 for coupling one or more SCSI devices 324 and one or more expanders 326 in accordance with one embodiment of the present invention. The expander 326, coupled between SCSI buses 300 and 330, effectively extends the length of the SCSI bus 300 by allowing one or more SCSI devices 328 to be attached to the SCSI bus 330. The SCSI bus 300 includes a set of electrical lines (e.g., wires) for carrying data and control signals. In this illustrated embodiment, a set of data lines 302 comprising data0 to data15 defines a datapath used for carrying data. A parity line 304 is provided in the bus 300 for transmitting a parity bit. In addition, a set of control lines 306, 308, 310, 312, 314, 316, 318, 320, and 322 is used to carry well known SCSI control signals BSY (busy), ACK (acknowledge), RST (reset), MSG (message), SEL (select), C/D (control/data), REQ (request), I/O (input/output), and ATN (attention), respectively. Table 1 shows these control signals and their functions.

TABLE 1

| SIGNAL | FUNCTION |
|---|---|
| BSY | Indicates whether the bus is currently busy. |
| SEL | Asserted by an initiator or target to select target or initiator, respectively. |
| C/D | Indicates whether control data is placed on the bus. |
| I/O | Indicates direction of data flow on the data bus relative to the initiator. |
| MSG | Activated by a target during a message phase. |
| REQ | Indicates data transfer handshake request by a target. |
| ACK | Indicates data transfer handshake acknowledge by an initiator. |
| ATN | Activated by an initiator to indicate an attention condition. |
| RST | Used to reset all connected SCSI devices. |

Although the SCSI bus 300 is illustrated with 16-bit data bus of 16-bit datapath, it may also be implemented using any N-bit data bus where N is an even number multiple of 2 such as 8, 16, 32, etc. In addition, it is noted that the present invention may be implemented using any SCSI protocols such as SCSI-1, SCSI-2, SCSI-3, and the like.

In conventional SCSI buses, a SCSI device address (i.e., ID) is a value corresponding to one of the bit positions on the data bus. Allowable device addresses on conventional SCSI buses may range from 0 to 7 on an eight-bit bus and 0 through 15 on a wide (16-bit) bus. In a SCSI I/O subsystem with 16-bit SCSI data bus, for example, a host adapter may have a SCSI ID of "15" corresponding to data bus line (e.g., data15) while other SCSI devices may have a SCSI ID ranging from "0" to "14" (e.g., data0 to data 14). The SCSI IDs asserted on a SCSI bus serve to determine device priority during arbitration and to establish communications with another device during selection or reselection. SCSI protocols specifying the priority of SCSI IDs are well known to those skilled in the art. For example, the priority of SCSI IDs ranging from 0 to 15, in the order of highest to lowest priority, may be 7, 6, 5, 4, 3, 2, 1, 0, 15, 14, 13, 12, 11, 10, 9, and 8.

During a SCSI arbitration phase, a SCSI device contends for the SCSI bus by asserting a data bit line corresponding to its SCSI ID. When several devices are arbitrating for the bus, relative bit positions of the contending devices are used to determine which device wins the arbitration. That is, the contending device with the highest priority SCSI ID wins the arbitration. Upon winning arbitration, the winning device asserts, as an initiator, the SCSI ID of a target device on the data bus. Thus, at this time, the SCSI IDs of both the initiator and target are asserted. This, in turn, means that only two data bus lines corresponding to the SCSI IDs of the initiator and target are asserted on the SCSI bus. The target device corresponding to the asserted SCSI ID of the target then responds by asserting a SEL signal on the SCSI bus and gains control of the bus for communication with the initiator.

In the conventional SCSI protocols, the selection or reselection of a target device requires assertion of only two data bus lines corresponding to the SCSI IDs of the initiator and the target device. If more than two data bus lines are asserted, the target device does not respond to the initiator's selection or reselection attempt because it will not recognize the assertion of more than two data bus lines as valid selection or reselection protocol.

The present invention provides methods for automatically assigning IDs to expanders to allow addressing of the expanders without using conventional SCSI IDs. Specifically, given that a SCSI bus has an N-bit datapath corresponding to N data lines in the SCSI bus, the present invention defines the expanded address space for addressing expanders and/or other devices by partitioning the N data bits in the datapath of the SCSI bus into two components: an expanded ID (XID) field and an expanded signature (XSIG) field. Preferably, the datapath is partitioned equally so that the expanded ID field and the expanded signature field are N/2 bits each. In addition, an address for an expander or other device is comprised of more than two bits asserted on the data lines of the SCSI bus so that conventional SCSI devices do not respond when an expander is being selected.

Figure 3B:
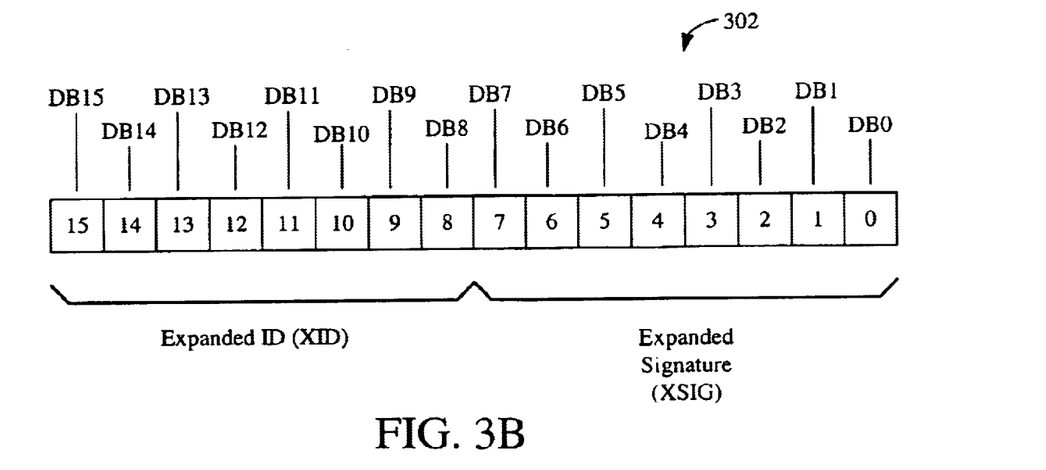
FIG. 3B shows a schematic diagram of a 16-bit datapath of the SCSI data bus partitioned to provide expanded addressing capability in accordance with one embodiment of the present invention.

FIG. 3B shows a schematic diagram of the 16-bit datapath of the SCSI data bus 302 partitioned to provide expanded addressing capability in accordance with one embodiment of the present invention. The partitioning of the datapath involves dividing the 16 bits (i.e., bit 0 to bit 15 or DB0 to DB15) into an 8-bit expanded ID field (XID) and an 8-bit expanded signature (XSIG) field. The 8-bit expanded ID is thus defined by the bits DB8 to DB15 while the 8-bit expanded signature corresponds to the bits DB0 to DB7. In this scheme, the lower 8-bit expanded signature is used to identify a device as an expander while the higher 8-bit expanded ID is used to uniquely identify individual expanders. In addition to identifying expanders, the expanded signature field may also be used to identify difference types or categories of SCSI devices such as expanders, enclosure chips, terminators, etc. In such instances, different expanded signatures may be assigned to expanders, enclosure chips, and terminators.

The addressing of expanders is performed by extending conventional SCSI addressing during selection phase based on the fact that a legacy SCSI target device of a selection will only respond to a certain set of ID bits asserted on a SCSI data bus. That is, standard SCSI devices respond only when two bits corresponding to the IDs of the initiator and their own ID are asserted on the SCSI data bus.

To assign SCSI IDs to expanders without using conventional SCSI IDs, each SCSI ID (e.g., address) of the expanders is configured to have more than two bits asserted on the SCSI data bus. This ensures that conventional SCSI devices do not respond when selecting expanders. In one embodiment, SCSI expanders are configured to respond to a selection with five or more bits asserted. For example, five bits may be asserted in expanded signature field and one to seven bits may be asserted in the expander ID field. The five bits in the expanded signature field ensure that neither standard nor extended address SCSI devices will consider the SCSI expander selection address as being valid. Extended addressing of SCSI devices is described in U.S. patent application Ser. No. 09/636,038, entitled "Methods for Addressing Extended Number of Peripheral Devices over Peripheral Bus," by Charles A. Monia et al. and is incorporated herein by reference.

The expanded signature is assigned a pattern that will not be mistaken by a legacy device. In one embodiment, the expanded signature pattern is configured to have at least three bits asserted to prevent a legacy SCSI device from recognizing the selection IDs as being valid. More preferably, the expanded signature pattern includes at least five asserted bits to operate properly with extended addressing of SCSI devices described above. Table 2 shows an exemplary set of possible 8-bit expanded signatures in hexadecimal numbers that can be assigned to expanders for a 16-bit SCSI data bus in accordance with one embodiment of the present invention. The 8-bit expanded signatures in Table 2 are organized according to the number of bits asserted (x,y) in the two 4-bit blocks making up the 8-bit number.

TABLE 2

| Expanded Signature (1,4) | Expanded Signature (2,3) | Expanded Signature (3,2) | Expanded Signature (4,1) |
|---|---|---|---|
| 1Fh | 37h | 73h | F1h |
| 2Fh | 3Bh | 75h | F2h |
| 4Fh | 3Dh | 76h | F4h |
| 8Fh | 3Eh | 79h | F8h |
|  | 57h | 7Ah |  |
|  | 5Bh | 7Ch |  |
|  | 5Dh | B3h |  |
|  | 5Eh | B5h |  |
|  | 67h | B6h |  |
|  | 6Bh | B9h |  |
|  | 6Dh | BAh |  |
|  | 6Eh | BCh |  |
|  | 97h | D3h |  |
|  | 9Bh | D5h |  |
|  | 9Dh | D6h |  |
|  | 9Eh | D9h |  |
|  | A7h | DAh |  |
|  | ABh | DCh |  |
|  | ADh | E3h |  |
|  | AEh | E5h |  |
|  | C7h | E6h |  |
|  | CBh | E9h |  |
|  | CDh | EAh |  |
|  | CEh | ECh |  |

In the 16-bit SCSI bus datapath, the expanded ID in the expanded ID field is a binary number from 00h through FFh. Each of the expanders is assigned a unique expander ID to allow individual addressing of the expanders. Table 3 illustrates exemplary expanded IDs used with some of the expanded signatures in accordance with one embodiment of the present invention.

TABLE 3

| Expanded Signature | Expanded ID | Selection Description |
|---|---|---|
| 37h | FFh | Null |
|  | A0h–FEh | Reserved |
|  | 80h–9Fh | Select individual hardwired terminator 0–31 |
|  | 00h–7Fh | Reserved for SCSI device addresses to allow hardware decode of target ID to determine normal versus expanded selection |
| 3Dh | FFh | Null |
|  | A0h–FEh | Reserved |
|  | 80h–9Fh | Select individual Enclosure Chip 0–31 |
|  | 00h–7Fh | Reserved for SCSI device addresses to allow hardware decode of target ID to determine normal versus expanded selection |
| A7h | FFh | Null used for topology discovery and expander address phases |
|  | FEh | Broadcast select start expander address phase (ignored by hardwired expanders) |
|  | FDh | Broadcast select stop expander address phase (ignored by hardwired expanders) |
|  | FCh | Broadcast select automatic addressable expanders (ignored by hardwired expanders) |
|  | FBh | Broadcast select reset expander addresses (ignored by hardwired expanders) |
|  | FAh | Broadcast select start topology phase |
|  | A9h | Broadcast select stop topology phase |
|  | F1h–F8h | Reserved for future broadcast select codes |
|  | F0h | Broadcast expander reset (reset to default expander characteristics) |
|  | C0h–EFh | Reserved |
|  | A0h–BFh | Select individual hardwired expanders 0–31 |
|  | 80h–9Fh | Select individual auto-addressable expanders 0–31 |
|  | 00h–7Fh | Reserved for SCSI device addresses to allow hardware decode of target ID register to determine normal versus expanded selection |

As shown in Table 3, three different expanded signatures, i.e., 37h, 3Dh, and A7h, are defined for addressing hardwired terminators, enclosure chips, and expanders, respectively. For each type of expanded signatures, up to 256 devices and/or functions are addressable. For example, for signature A7h, expanded IDs from A0 to BFh allows addressing of up to 32 hardwired expanders; expanded IDs from 80h to 9Fh allows addressing of up to 32 auto-addressable expanders; and other values are used for various functions such as F0h for broadcast expander reset. It should be appreciated, however, that the present invention may be implemented using any suitable expanded signature XSIG to select a chip type (e.g., expander) and expanded ID XID to select a device and/or function with more than two bits asserted.

With continuing reference to Table 3, a broadcast selection, for which XID is between F0h and FFh, does not require any response from target expanders. All expanders continually monitor the SCSI bus for broadcast selections. The expanders decode XID and XSIG values on the SCSI data bus to determine a selection type. The broadcast selection is valid for all SCSI expanders of the a signature type (XSIG) unless an expander does not support such function. For example, hardwired expanders ignore any broadcasts relative to automatic addressing.

A unique selection, for which XID is between 80h and EFh, on the other hand, requires a response from the target expander and a subsequent SCSI command. Hardwired and auto-addressable expanders are assigned within different address ranges to allow easy mixing within the same SCSI I/O subsystem, although both may share the same address space.

Figure 4:
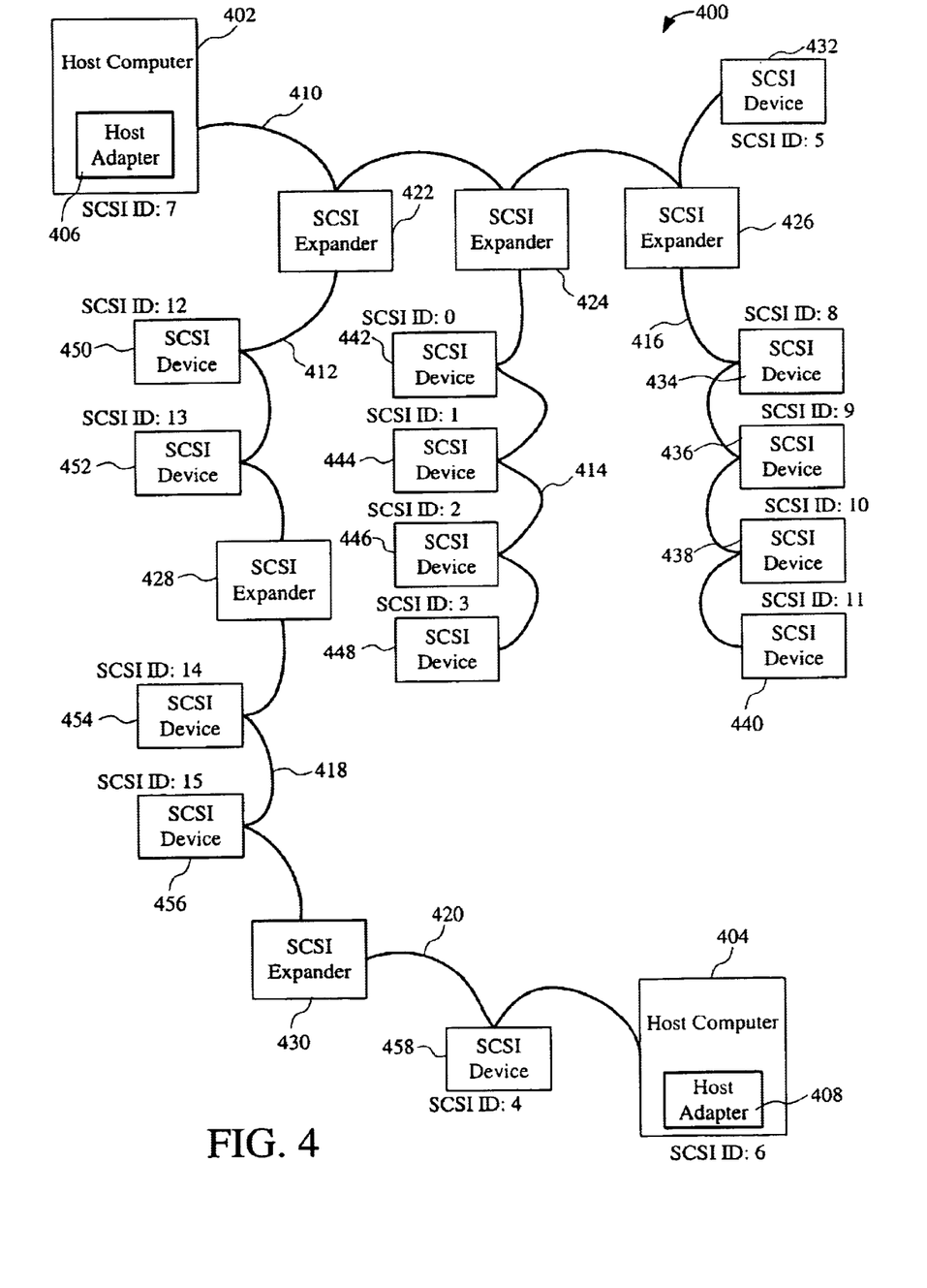
FIG. 4 shows a block diagram of an exemplary computer I/O subsystem implementing automatic expander addressing scheme in accordance with one embodiment of the present invention.

A pair of XID and XSIG together defines an expanded address that can be assigned to individual expanders for addressing. FIG. 4 shows a block diagram of an exemplary computer I/O subsystem 400 implementing automatic expander addressing scheme in accordance with one embodiment of the present invention. A pair of host computers 402 and 404 includes SCSI host adapters 406 and 408, respectively, for communicating with SCSI devices in the I/O subsystem 400. The I/O subsystem 400 includes SCSI host adapters 406 and 408, a plurality of SCSI buses 410, 412, 414, 416, 418, and 420, a plurality of SCSI expanders 422, 424, 426, 428, and 430, and a plurality of SCSI devices 432, 434, 436, 438, 440, 442, 444, 446, 448, 450, 452, 454, 456, and 458. It should be noted that the I/O subsystem 400 is exemplary only and may be implemented using any suitable number of SCSI expanders, SCSI devices, and host computers with host adapters.

On one side, the host adapter 406 couples the host computer 402 to expanders 422, 424, and 426, and SCSI device 432 via SCSI bus 410 in a daisy chain fashion. On the other side, the host adapter 408 couples the host computer 404 to expander 430 and SCSI device 458 via SCSI bus 420 in a daisy chain. The host adapters 406 and 408 function to interface and control communication between the respective host computers 402 and 404 and the I/O subsystem 400. Although the present invention is illustrated in conjunction with SCSI buses and devices, it may also be utilized in any suitable peripheral buses and bus devices. In addition, the I/O subsystem 400 may accommodate any suitable number of peripheral devices in accordance with the type of SCSI protocols.

The expanders 422, 424, 426, 428, and 430 are in-line devices that effectively extend the length of SCSI bus in the I/O subsystem 400 to run for greater distance than is allowed using a single SCSI bus. Specifically, the expander 422 is coupled to the SCSI bus 412, which is coupled to SCSI devices 450 and 452, and the expander 428 in a daisy chain. The expander 428, in turn, is coupled in a daisy chain to the SCSI bus 418, which is daisy chained to SCSI devices 454, 456, and expander 430. The expander 430 is further daisy chained to SCSI device 458 and host adapter 408 via SCSI bus 420. Similarly, the expander 424 is daisy chained to SCSI devices 442, 444, and 446, and 448 via SCSI bus 414. Likewise, the expander 426 is daisy chained to SCSI devices 434, 436, 438, and 440 via SCSI bus 416.

Figure 5:
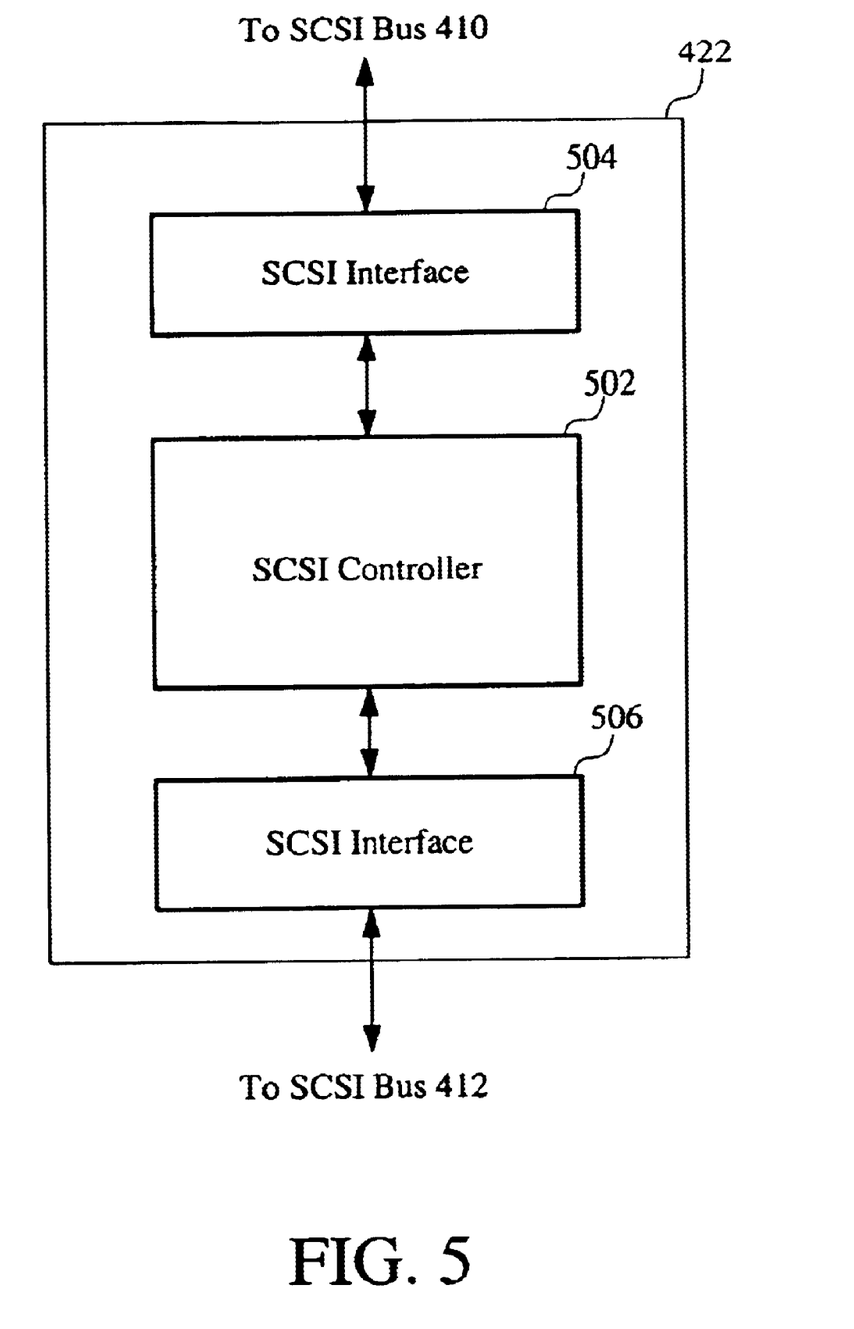
FIG. 5 shows a schematic block diagram of an intelligent SCSI expander in accordance with one embodiment of the present invention.

FIG. 5 shows a schematic block diagram of SCSI expander 422 in accordance with one embodiment of the present invention. The SCSI expander 422 is configured to interface and communicate data and control signals between SCSI buses 410 and 412. The SCSI expander 422 includes a SCSI controller 502 and a pair of SCSI interfaces 504 and 506. The SCSI interfaces 504 and 506 together function to receive and drive signals received from either SCSI bus 410 or 412 for transmission to the other SCSI bus. Other expanders 424, 426, 428, and 430 in the I/O subsystem 400 may be implemented in a similar manner.

Figure 6A:
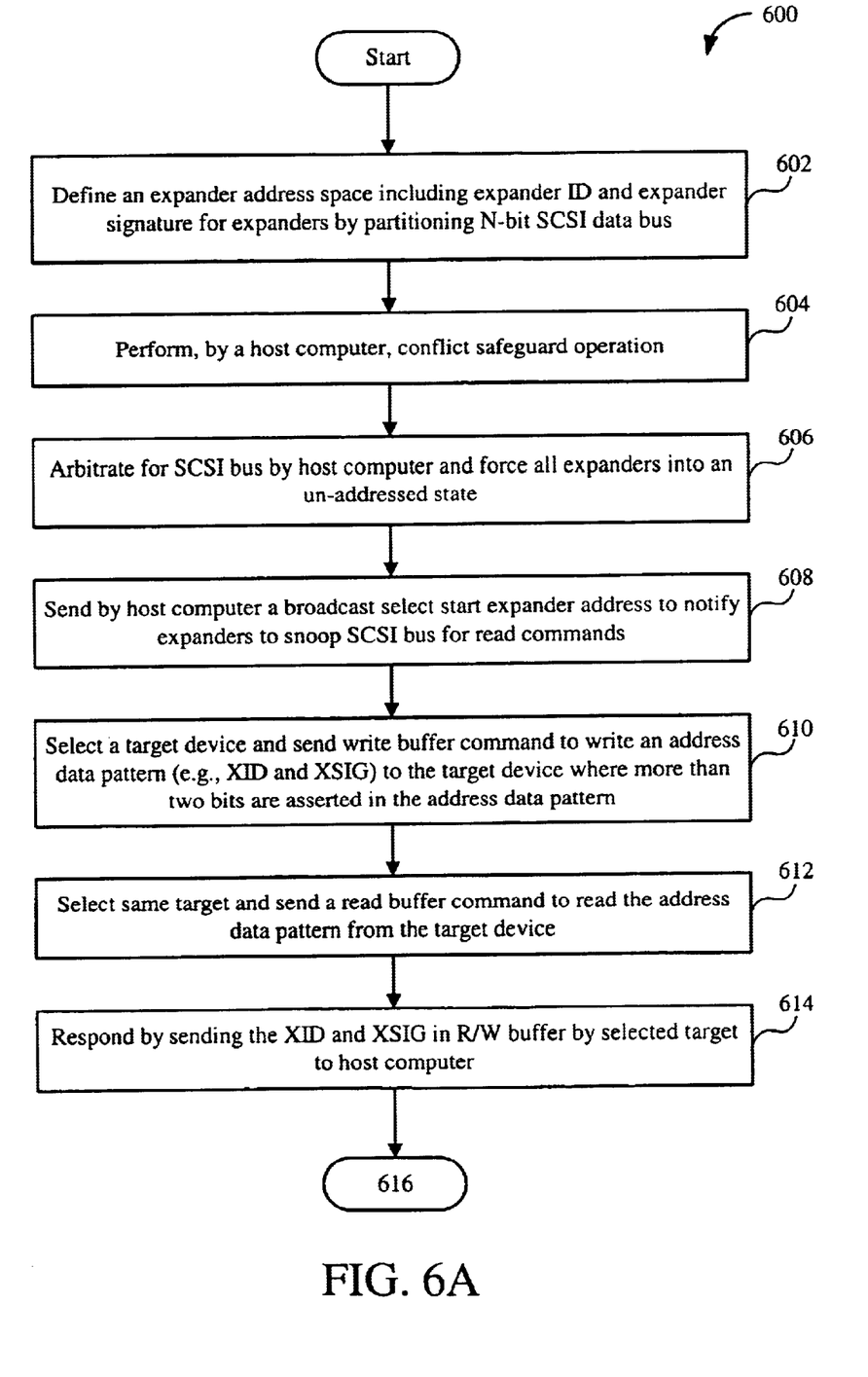
FIGS. 6A and 6B are flowcharts of a method for automatically assigning expander addresses to intelligent expanders in an I/O subsystem in accordance with one embodiment of the present invention.
Figure 6B:
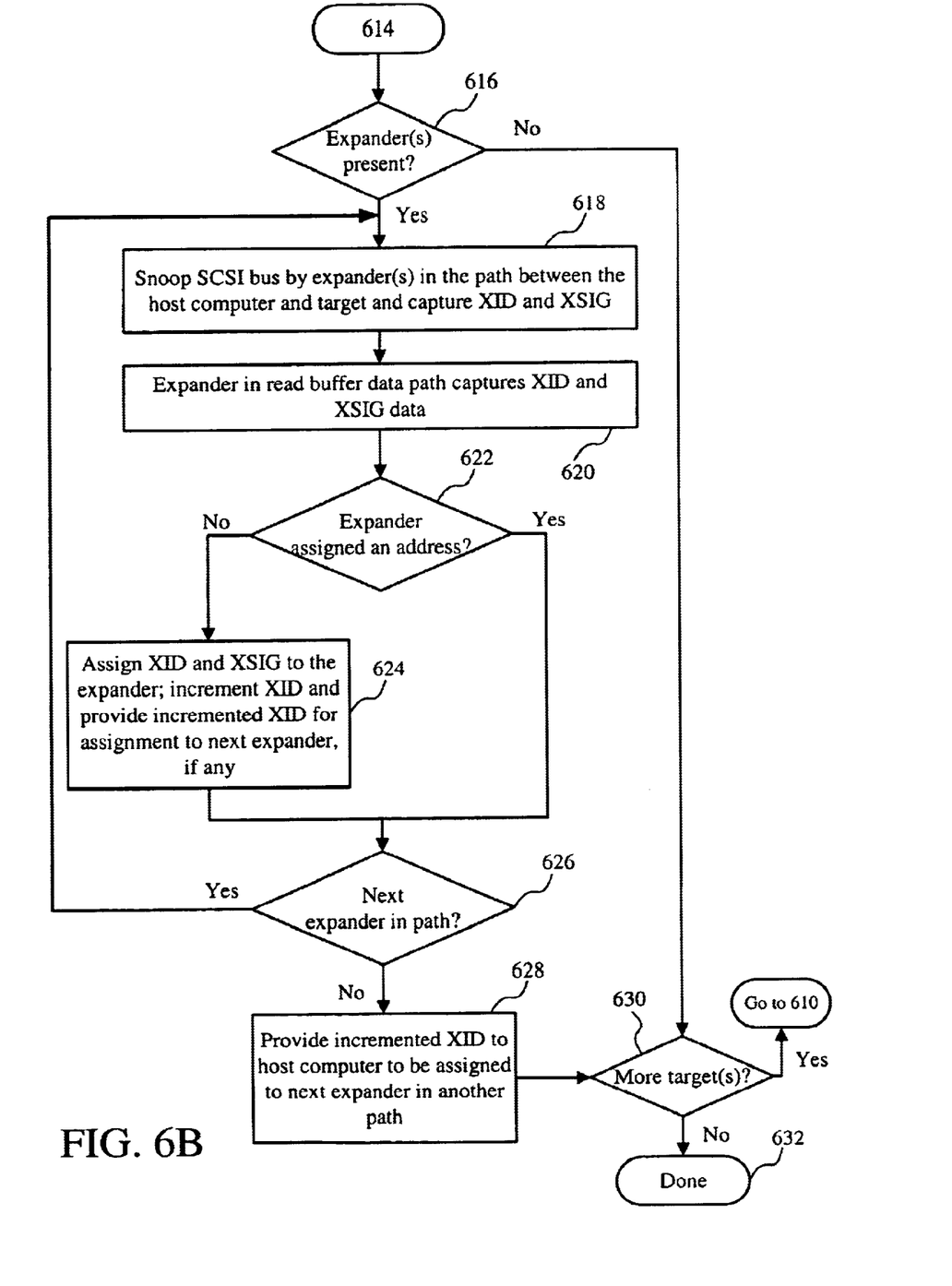

FIGS. 6A and 6B are flowcharts of a method 600 for automatically assigning IDs (i.e., addresses) to intelligent expanders in an I/O subsystem in accordance with one embodiment of the present invention. The method 600 may be executed as needed whenever the I/O subsystem configuration changes. Initially, an expander address space is defined for the intelligent expanders in operation 602. The expander address space is preferably defined, for example, by partitioning N-bit SCSI data bus into an XID and XSIG fields as discussed above. The XID field contains an expander ID while the XSIG field contains expander signature.

Then in operation 604, a host computer performs conflict safeguard operation to ensure that only one host computer is to perform the address assignment method. The conflict safeguard operation is designed to avoid conflict with another host computer that may attempt to assign addresses to expanders while the host computer is executing address assignment method. Thus, the conflict safeguard operation allows only one host computer to assign addresses. In conflict safeguard operation, each host computer is configured to know when another host computer is executing the expander address assignment method to avoid attempting conflicting operations on the I/O Subsystem. For example, the conflicting operations may be issuing or having outstanding write or read buffer commands, issuing any expander commands, or having any expander operations pending such as I/O subsystem topology discovery. Preferably, host software/hardware is not functionally sensitive to expander addresses since they may change from one discovery to the next, even without a physical topology change. When I/O subsystem configuration changes by addition of one or more expanders, a host computer may perform the address assignment method again including power-down and power-up of existing expanders because the addresses will no longer be valid.

By way of example, the conflict safeguard is performed through host/host communication. Specifically, when a host computer is to begin an expander address phase indicating execution of expander address assignment method, it sends a Send Diagnostic command to all other hosts with parameters indicating a start expander address phase. The receiving host responds with GOOD status if no other host has already started an expander address or topology discovery phase, and it responds with bad status or command reject if another host has already started an expander address or topology discovery phase. The sending host will eventually issue a Receive Diagnostic Command to which the receiving host returns the Expander Address Phase XREADY or XNOTREADY status. If the receiving host does not have any outstanding read or write buffer commands, it returns XREADY. On the other hand, if it has any read or write buffer commands outstanding, it returns XNOTREADY. When XNOTREADY, it completes the outstanding commands (normal or abort) as soon as possible. The sending host will repeatedly send the RECEIVE command, thus polling for XREADY. Each host is free to issue any commands other than read or write buffer to the SCSI devices during this host communication exchange or during the expander addressing phase.

After the conflict safeguard operation 604, the host arbitrates for the SCSI bus in operation 606 and goes into expanded selection phase and forces all expanders to an un-addressed state, for example, by issuing broadcast reset expander address (FBA7h) over the SCSI bus. The host then issues broadcast select start expander address (FEA7h) in operation 608. The broadcast select start expander address notifies all auto-addressable expanders to snoop SCSI bus for read buffer command. During the expander address phase, the other hosts will not issue conflicting write and read buffer commands.

The host then selects each SCSI Device sending a write buffer command followed by a read buffer command. Specifically, in operation 610, the host selects a target peripheral device and sends a write buffer command to write an address pattern that includes XID and XSIG into a R/W buffer in the target device. Preferably, the address pattern is configured to include more than two bits asserted in the address pattern to distinguish expanders from conventional SCSI devices. Then, the host selects the same target device in operation 612 and sends a read buffer command to read the XID and XSIG from the R/W buffer of the target device.

In one embodiment, the size of the transfer is preferably equal to the number of bits representing XID and XSIG. For instance, in a 16-bit SCSI data bus, the first WORD of the address data pattern may be an 8-bit XID and an 8-bit XSIG. The remaining words may be set to 0000h. For example, the host begins by writing a value of 80A7h, which corresponds to (First XID, XSIG), in the first WORD of the write buffer data.

In response to the read buffer command, the target device sends, in operation 614, the address data pattern, i.e., XID and XSIG, written previously under the write buffer command. Preferably, the response of the target device is asynchronous and wide.

With reference to FIG. 6B, it is determined in operation 616 whether any expanders are present in the path between the host and the target device. If no expander is present, the method proceeds to operation 630 to select another target. However, if one or more expanders are present in the path between the host and target device, the method proceeds to operation 618. In this operation, each auto-addressable SCSI expander, which is coupled between the host and the target device in the path of the read buffer command, snoops the SCSI bus and captures address data pattern (i.e., XID and XSIG) placed on the SCSI bus. The in-line expander captures the XID and XSIG data in operation 620. Then, the expander determines whether it has already been assigned an address in operation 622, for example, by checking if the expander has seen a previous read buffer response with XSIG value of A7h. If the expander has not been assigned an address, it saves the XID value as its expander address and increments XID by one in operation 624. On the other hand, if the expander has already seen the response and saved an XID, it passes the address data untouched.

Then, in operation 626, it is determined whether any more expanders are present in the path between the host and the target device. If so, the method proceeds back to operation 620, the expanders snoop the SCSI bus to capture the incremented address data pattern for assignment to one of the expanders. If there is no more expanders in the path between the host and the target device, the method proceeds to operation 628 to provide incremented XID to the host computer for assignment to a next expander in another path, if any. The method then proceeds to operation 630, where it is determined whether more target devices exist in the I/O subsystem for traversal. If so, the method proceeds back to operation 610, where the host selects another target device to assign addresses starting from the incremented XID to expanders present in the path between the host and the newly selected target device. Otherwise, the method terminates in operation 632 when all auto-addressable expanders have been addressed.

For each XSIG value, the maximum number of expanders that can be uniquely addressed is $2^M$ where M is the number of bits in an XID field. In addition, the methods of the present invention may also be used to address more than $2^M$ expanders by utilizing multiple values of XSIG. By way of example, when the host receives XID address data, it stores the address value (XID, XSIG) that specifies the next available expander address for assignment. If the next address is A0A7h, for example, and all XIDs within the XSIG ID value of A7h are used, additional expanders may be addressed by using other available XSIG values.

By way of example, the address assignment of expanders is illustrated with reference to the I/O subsystem 400 shown in FIG. 4. After initial system power-up, both SCSI hosts 402 and 404 performs discovery of all SCSI devices and their IDs including the host adapters 406 and 408 with SCSI IDs of 7 and 6, respectively. Then, one of the hosts 402 or 404 executes expander discovery and addressing phases in accordance with method 600 shown in FIGS. 6A and 6B. Table 4 shows selection sequence of SCSI devices by host 402 to automatically assign addresses to expanders 422, 424, 426, 428, and 430 in accordance with one embodiment of the present invention.

TABLE 4

| Selection Sequence | Target SCSI Device | Write Buffer Data | Read Buffer Response | Expander Addresses Assigned: (XID, XSIG ID)hex |
|---|---|---|---|---|
| 1 | 0 | 80A7h | 81A7h | Expander 424: (80,A7) |
| 2–4 | 1–3 | 81A7h | 81A7h | None |
| 5 | 4 | 81A7h | 84A7h | Expander 430: (81,A7); Expander 428: (82,A7); Expander 422: (83,A7) |
| 6 | 5 | 84A7h | 84A7h | None |
| 7 | 6 | 84A7h | 84A7h | None |
| 8 | 8 | 84A7h | 85A7h | Expander 426: (84,A7) |
| 9–15 | 9–15 | 85A7h | 85A7h | None |

As shown in Table 4, the host computer 402 sequentially traverses SCSI devices in the order of their SCSI IDs to assign addresses to expanders. Specifically, the host computer 402 selects SCSI device 442 with SCSI ID of "0" and writes an address data pattern of 80A7h into a read/write buffer of the selected SCSI device 442. The host computer 402 then selects SCSI device 442 and issues a read buffer command to read the content of the read/write buffer. The selected SCSI device 442 then responds to the read command by sending the address data pattern 80A7h over the SCSI bus. At this time, the SCSI expander 424 in the path between the host computer 402 and the SCSI device 442 captures the address data pattern 80A7h and assigns the captured address pattern 80A7h as its XID and XSIG ID, where XID is 80h and XSIG ID is A7h. The expander 424 then increments XID by one to a value of 81h and places incremented address pattern 81A7h over the SCSI bus. Because no more expander is present in the signal path directly between the SCSI device 442 and host computer 402, the incremented address pattern 81A7h is provided to the host computer 402. For example, expanders 422 and 426 are not in the path between SCSI device 442 and host computer 402 because the address signal does not go through these expanders directly from one SCSI bus to another.

After receiving the modified address pattern, the host computer 402 sequentially writes and reads the modified address pattern 81A7h to SCSI devices 444, 446 and 448 with SCSI IDs of 1, 2, and 3, respectively, through expander 424. During these operations, however, no new unaddressed expander is found in the path of the devices 444, 446, and 448 and host computer 402. Accordingly, the modified address pattern is not assigned to any expanders.

After these operations, the host computer 402 selects the next SCSI device 458 with SCSI ID of 4 and performs a write and read operation by sending the modified address pattern 81A7h to the SCSI device 458. In the path between the SCSI device 458 and the host computer 402, three SCSI expanders 422, 428, and 430 are present. When the SCSI device 458 places the address pattern 81A7h on the SCSI bus in response to the read command, the SCSI expander 430 captures the address pattern 81A7h for its address. The expander 430 then increments the XID portion (e.g., 81h) of the address pattern and places an incremented address pattern 82A7h on the SCSI bus. The next expander 428 in the path then captures the modified address pattern 82A7h, which is assigned as the address of the expander 428. The expander 428 then increments the XID portion (e.g., 82h) of the assigned address pattern and places incremented address 83A7h on the SCSI bus. Then, the SCSI expander 422 captures the incremented address 83A7h as its address. The expander 422 then modifies the address by incrementing the XID portion of the address and places the modified address of 84A7h on the SCSI bus for communication to the host computer 402.

After receiving the modified address pattern 84A7h, the host computer 402 traverses SCSI devices 432 and 408 with SCSI IDs of 5 and 6, respectively. During these operations, however, no unaddressed expander is found. Thus, the address pattern 84A7h is not modified.

Then, the host computer 402 selects next SCSI device 434 with SCSI ID of 8 and sends a write and read buffer command to the selected device 434. When the SCSI device 434 returns the address pattern 84A7h, the SCSI expander 426 captures the address pattern and assigns the address as its own address. Then, the expander 426 increments the XID portion of the address pattern and places an incremented address pattern, 85A7h, on the SCSI bus for communication to the host computer 402.

The host computer 402 then sequentially traverses the remaining SCSI devices 436 to 458 with SCSI IDs of 9 to 15, respectively. Because there is no more expanders to be addressed, the write and read commands from the host computer 402 result in returning of the address pattern 85A7h without modification. In this manner, the expanders 422, 424, 426, 428, and 430 are automatically addressed with a unique ID.

The assignment of addresses may differ when another host performs assignment of addresses to expanders. For example, Table 5 illustrates selection sequence of SCSI devices by host 404 to automatically assign addresses to expanders 422, 424, 426, 428, and 430 in accordance with another embodiment of the present invention.

TABLE 5

| Selection Sequence | Target SCSI device | Write Buffer Data | Read Buffer Response | Expander Addresses Assigned: (XID, XSIG ID)hex |
|---|---|---|---|---|
| 1 | 0 | 80A7h | 84A7h | Expander 424: (80,A7); Expander 422: (81,A7); Expander 428: (82,A7); Expander 430: (83,A7) |
| 2–7 | 1–5, 7 | 84A7h | 84A7h | None |
| 8 | 8 | 84A7h | 85A7h | Expander 426: (84,A7) |
| 9–15 | 9–15 | 85A7h | 85A7h | None |

The assignment of expanded ID and expanded signature to expanders allows selection of individual expanders. Under the addressing scheme shown in Table 5, for example, to select expander 424, an initiator asserts an XID of 80h and XSIG ID of 7Ah on the SCSI data bus. This ensures that more than two bits are asserted on the SCSI data bus. According to conventional SCSI protocols, assertion of more than two bits during selection is invalid for selecting legacy SCSI devices. Accordingly, legacy SCSI devices 432 to 458 will examine the SCSI bus and will not respond to the selection.

On the other hand, expanders 422 to 430 examine the SCSI bus and determine that the XSIG of 7Ah correspond to their expander signatures. Accordingly, these expanders 422 to 430 proceed to examine the XID on the SCSI bus to determine whether the asserted XID on the SCSI buses match their XIDs. Upon examining the XID on the SCSI buses, the expanders 422, 426, 428, and 430 determine that their XIDs do not match the asserted XID and will drop out of contention. The expander 424, however, determines that the asserted XID on the SCSI bus matches its XID of 80h and will respond to the selection by asserting BSY signal. Similarly, any of the other expanders may be selected by asserting an associated XSIG and XID while preserving the basic properties of the conventional SCSI addressing protocol. The assignment and selection of expanders is described in further detail in a related U.S. patent application Ser. No. 09/798,278, entitled "Methods for Assigning Addresses to Expanded Devices in I/O Subsystem," which was previously incorporated by reference above.

Thus, the methods of the present invention allow automatic assignment of addresses to expanders without using conventional one-bit SCSI device IDs. For example, the address data patterns to be assigned to expanders are configured to have more than two bits asserted so that conventional SCSI IDs are reserved for addressing legacy SCSI devices. This scheme thus allows addressing of both legacy SCSI devices and expanders without reducing the number of addressable legacy SCSI devices in an I/O subsystem.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for automatically assigning addresses to expanders in a computer I/O subsystem that is coupled to one or more host computers, the computer I/O subsystem including one or more peripheral buses, a set of peripheral devices, and a set of expanders, each expander being arranged to couple a pair of peripheral buses, the peripheral devices being coupled to the peripheral buses, the method comprising:

a) selecting, by a host computer, a peripheral device as a target device and writing an address data pattern to the selected target device;

b) selecting, by the host computer, the target device and reading the address data pattern from the target device; and c) assigning unique addresses to one or more expanders coupling the host computer and the target device, wherein the unique addresses are assigned to the one or more expanders starting from the address data pattern.

2. The method as recited in claim 1, wherein the operation of assigning addresses to the one or more expanders further comprises:

selecting an expander among the one or more expanders coupling the host computer and the target device;

assigning the address data pattern to the selected expander as a unique address; and incrementing the address data pattern to generate a next address data pattern for assignment to a next expander.

3. The method as recited in claim 2, further comprising:

assigning the incremented address data pattern as the address data pattern;

selecting a new peripheral device as the target device; and
repeating operations a) to c) to assign addresses to expanders coupling the host computer and the new peripheral device.

4. The method as recited in claim 1, wherein the host computer issues a broadcast command to the expanders in the I/O subsystem, the broadcast command indicating an automatic addressing mode to automatically assign addresses to the expanders.

5. The method as recited in claim 3, wherein each of the expanders coupling the host computer and the target device captures the address data pattern.

6. The method as recited in claim 3, wherein each peripheral bus has an N-bit data bus and wherein an expander address space for the address data pattern is defined by partitioning the N-bit data bus into a pair of fields that includes an expander ID field and an expander signature field.

7. The method as recited in claim 6, wherein the address data pattern includes a common expander signature in the expander signature field and an expander ID in the expander ID field and wherein more than two bits are asserted in the address assigned for each of the expanders.

8. The method as recited in claim 7, wherein all the expanders share the common expander signature for identifying the expanders.

9. The method as recited in claim 7, wherein expander ID in the address data pattern in incremented to generate the next address data pattern.

10. The method as recited in claim 6, wherein each of the peripheral device is configured to have a one-bit ID corresponding to one of the N bits in the N-bit data buses, wherein each peripheral device is configured to respond to an initiating device only when two bits corresponding to its own ID and the ID of the initiating device are asserted on the N-bit data buses.

11. The method as recited in claim 1, wherein the peripheral buses are SCSI buses and the peripheral devices are SCSI devices.

12. The method as recited in claim 6, wherein N is an integer multiple of 8.

13. A method for automatically assigning addresses to expanders in a computer I/O subsystem that is coupled to one or more host computers, the computer I/O subsystem including one or more peripheral buses, a set of peripheral devices, and a set of expanders, each expander being arranged to couple a pair of peripheral buses, the peripheral devices being coupled to the peripheral buses, the method comprising:
 a) selecting, by a host computer, a peripheral device as a target device and sending a write buffer command to the target device to write an address data pattern;
 b) selecting, by the host computer, the target device and sending a read buffer command to the target device to read the address data pattern from the target device; and
 c) assigning unique addresses to one or more expanders coupling the host computer and the target device, wherein the unique addresses are assigned to the one or more expanders starting from the address data pattern by:
  c1) selecting an expander among the one or more expanders coupling the host computer and the target device;
  c2) assigning the address data pattern to the selected expander as a unique address; and
  c3) incrementing the address data pattern to generate a next address data pattern for assignment to a next expander.

14. The method as recited in claim 13, further comprising:
 assigning the incremented address data pattern as the address data pattern;
 selecting a new peripheral device as the target device; and
 repeating operations a) to c) to assign addresses to expanders coupling the host computer and the new peripheral device.

15. The method as recited in claim 13, wherein the host computer issues a broadcast command to the expanders in the I/O subsystem, the broadcast command indicating an automatic addressing mode to automatically assign addresses to the expanders.

16. The method as recited in claim 14, wherein each peripheral bus has an N-bit data bus and wherein an expander address space for the address data pattern is defined by partitioning the N-bit data bus into a pair of fields that includes an expander ID field and an expander signature field.

17. The method as recited in claim 16, wherein the address data pattern includes a common expander signature in the expander signature field and an expander ID in the expander ID field and wherein more than two bits are asserted in the address assigned for each of the expanders.

18. The method as recited in claim 17, wherein all the expanders share the common expander signature for identifying the expanders.

19. The method as recited in claim 17, wherein expander ID in the address data pattern in incremented to generate the next address data pattern.

20. The method as recited in claim 16, wherein each of the peripheral device is configured to have a one-bit ID corresponding to one of the N bits in the N-bit data buses, wherein each peripheral device is configured to respond to an initiating device only when two bits corresponding to its own ID and the ID of the initiating device are asserted on the N-bit data buses.

21. The method as recited in claim 13, wherein the peripheral buses are SCSI buses and the peripheral devices are SCSI devices.

22. The method as recited in claim 16, wherein N is an integer multiple of 8.

23. A method for automatically assigning addresses to expanders in a computer I/O subsystem that is coupled to one or more host computers, the computer I/O subsystem including one or more peripheral buses, a set of peripheral devices, and a set of expanders, each peripheral bus having an N-bit data bus, each expander being arranged to couple a pair of peripheral buses, the peripheral devices being coupled to the peripheral buses, the method comprising:
 a) defining an expander address space for address data patterns by partitioning the N-bit data bus into a pair of fields that includes an expander ID field and an expander signature field, wherein each address data pattern includes a common expander signature in the expander signature field and an expander ID in the expander ID field and wherein more than two bits are asserted in each of the address data patterns;
 b) issuing, by a host computer, a broadcast command to the expanders in the I/O subsystem, the broadcast command indicating an automatic addressing mode to automatically assign addresses to the expanders;
 c) selecting, by the host computer, a peripheral device as a target device and sending a write buffer command to the target device to write an address data pattern;
 d) selecting, by the host computer, the target device and sending a read buffer command to the target device to read the address data pattern from the target device; and e) assigning unique addresses to one or more expanders coupling the host computer and the target device, wherein the unique addresses are assigned to the one or more expanders starting from the address data pattern.

24. The method as recited in claim 23, wherein the operation of assigning unique addresses to the one or more expanders further comprises:

selecting an expander among the one or more expanders coupling the host computer and the target device;

assigning the address data pattern to the selected expander as a unique address; and incrementing the address data pattern to generate a next address data pattern for assignment to a next expander.

25. The method as recited in claim 24, further comprising:

assigning the incremented address data pattern as the address data pattern;

selecting a new peripheral device as the target device; and repeating operations c) to e) to assign addresses to expanders coupling the host computer and the new peripheral device.

26. The method as recited in claim 23, wherein each of the expanders coupling the host computer and the target device captures the address data pattern.

27. The method as recited in claim 23, wherein all the expanders share the common expander signature for identifying the expanders.

28. The method as recited in claim 25, wherein expander ID in the address data pattern in incremented to generate the next address data pattern.

29. The method as recited in claim 23, wherein each of the peripheral device is configured to have a one-bit ID corresponding to one of the N bits in the N-bit data buses, wherein each peripheral device is configured to respond to an initiating device only when two bits corresponding to its own ID and the ID of the initiating device are asserted on the N-bit data buses.

30. The method as recited in claim 23, wherein the peripheral buses are SCSI buses and the peripheral devices are SCSI devices.

31. The method as recited in claim 23, wherein N is an integer multiple of 8.

* * * * *